UNITED STATES PATENT OFFICE.

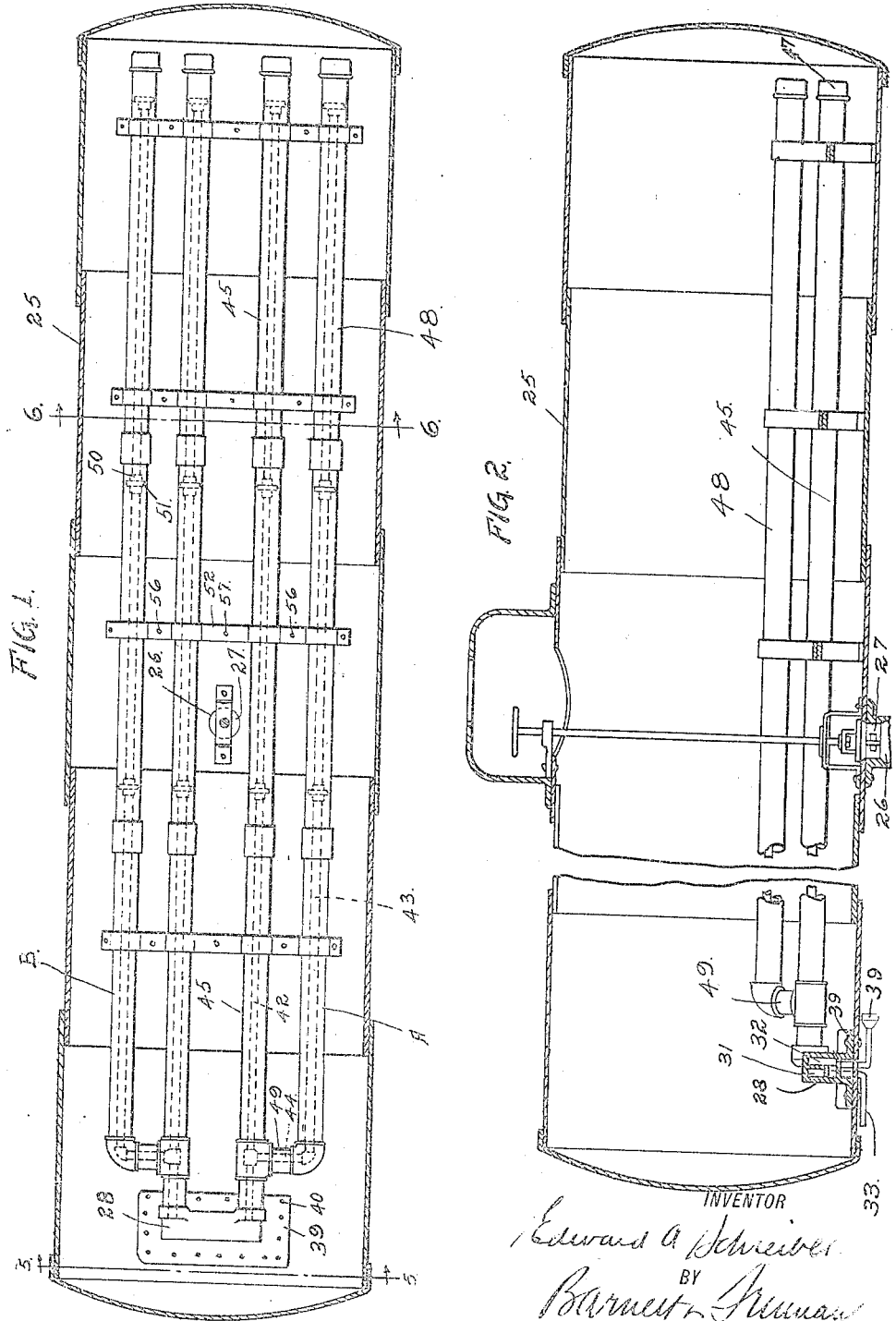

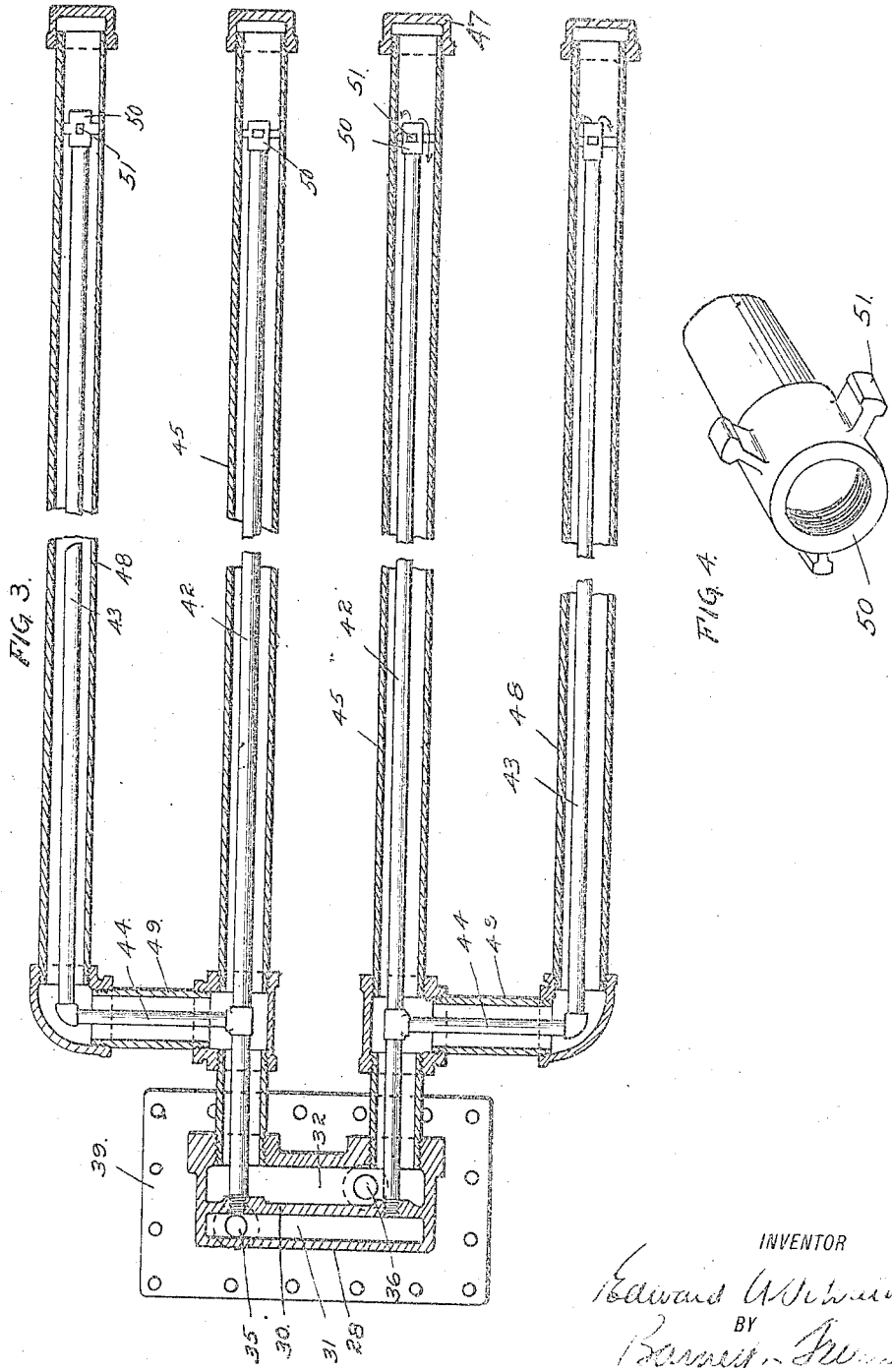

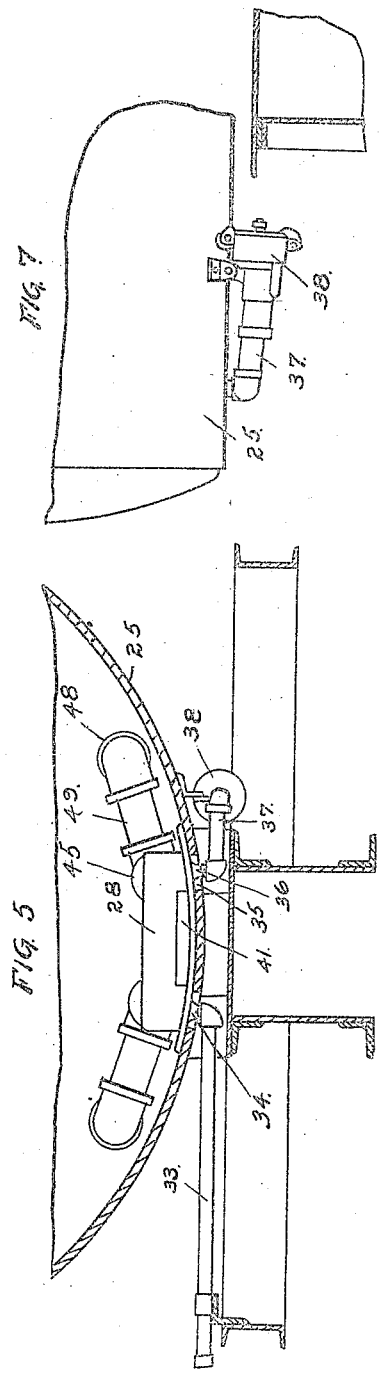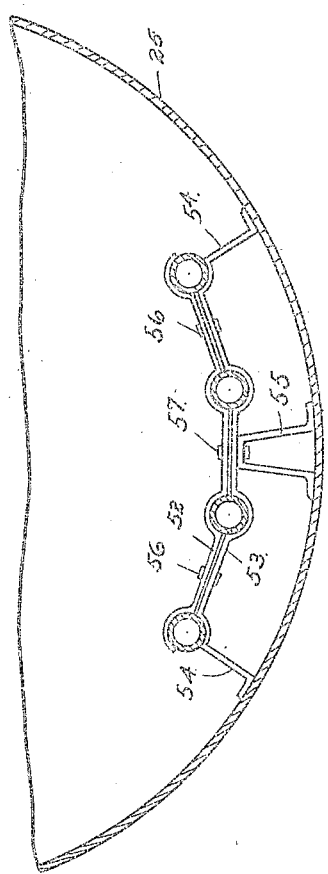

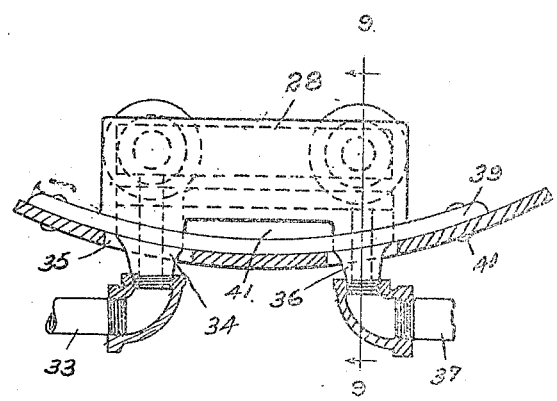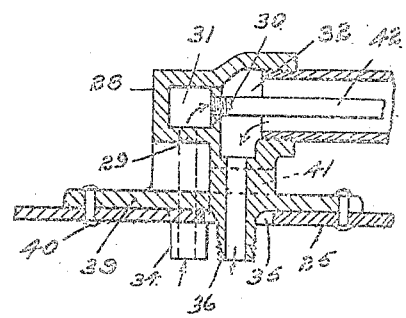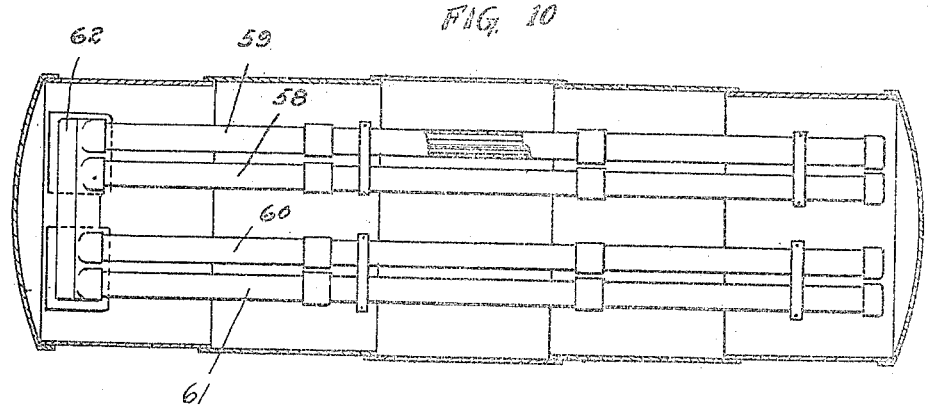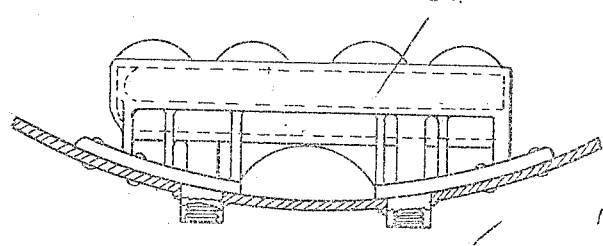

EDWARD A. SCHREIBER, OF CHICAGO, ILLINOIS, ASSIGNOR, BY MESNE ASSIGNMENTS, TO VAPOR CAR HEATING COMPANY, INC., A CORPORATION OF NEW YORK.

TANK-CAR HEATER.

1,306,837.        Specification of Letters Patent.     Patented June 17, 1919.

Application filed December 14, 1916. Serial No. 136,968.

*To all whom it may concern:*

Be it known that I, EDWARD A. SCHREIBER, a citizen of the United States, residing at Chicago, in the county of Cook and State of Illinois, have invented certain new and useful Improvements in Tank-Car Heaters, of which the following is a specification.

My invention relates to apparatus for heating the contents of a tank car in order, for example, to give it sufficient fluidity so that it may be readily discharged from the car; apparatus of this sort being of particular utility in connection with cars used for the transportation of crude oil or other liquid or semi-liquid, the fluidity of which is decreased by low temperature, in which case it is desirable to apply heat to the oil before it is discharged in order to facilitate such discharge.

The principal object of the invention is to provide a heating system for a car of this type which will be compact, so as to take up as little room as possible in the car; which will be so constructed as not to interfere, to any appreciable extent, with the complete discharge of material from the car, or with the cleaning of the car; and of which the parts will be so related that the apparatus will withstand the internal stresses set up when the heating pipes expand or contract. In this latter connection it will be understood that the cargo of the tank car is not heated in transit. The heat is applied after the car has reached its destination. For this reason, if the car has been traveling for some time through a region of low temperature the introduction of the steam, or other heating medium, into the heating coils, causes a rapid and unequal expansion of the metal with which it is brought into contact.

The invention consists in the novel and improved constructions, arrangements and devices to be hereinafter described and claimed for carrying out the above stated objects and such other incidental objects as will appear from the following description.

The invention is illustrated, in certain preferred embodiments, in the accompanying drawings wherein Figure 1 is a sectional plan of a tank car fitted with the heating apparatus of my invention.

Fig. 2 is a fragmentary vertical sectional view of the same.

Fig. 3 is a detail plan section of a set of circulating pipes and of the header through which medium is received and discharged.

Fig. 4 is a detail view, in perspective, of one of the guiding devices employed for centering and guiding the inner pipes in relation to the pipes which surround them.

Fig. 5 is a fragmentary cross sectional view on line 5—5 of Fig. 1.

Fig. 6 is a similar view on line 6—6 of Fig. 1.

Fig. 7 is a side elevation of one end of the car showing the steam trap.

Fig. 8 is an end view of the header for the circulating coils, a portion of the tank being shown in section.

Fig. 9 is a sectional view on line 9—9 of Fig. 8.

Fig. 10 is a sectional plan, and

Fig. 11 is a cross sectional view illustrating a modification.

Like characters of reference designate like parts in the several figures of the drawings.

Referring first to Figs. 1 to 9 inclusive, 25 designates the tank of the car provided with a substantially centrally arranged discharge opening 26 controlled by a valve 27. 28 is a fixture or header divided by webs 29, 30 into an inlet chamber 31 and an outlet chamber 32. 33 is a steam supply pipe communicating through nipple 34 with the inlet chamber 31, the nipple being formed integrally with the header and projecting through an opening 35 in the tank. On the other side of the header is a nipple 36 communicating with the outlet chamber 32 to which is connected a pipe 37 leading to a steam trap 38. The header is formed with a base plate 39 which is riveted to the tank by a set of marginal rivets 40. The header is formed just above the base plate with an opening 41 which permits the liquid in the tank to flow under the header, thereby minimizing the obstruction which the header offers to the complete and rapid discharge of the cargo.

The circulating system consists of two units A and B although the invention is not limited to this number. These units are alike so that it will be sufficient to describe one of them.

42 is a pipe, one end of which is screwed into the vertical interior web 30 of the header, the opposite end of the pipe being open. 43 is a pipe arranged parallel to pipe 42 and connected thereto near the header by branch pipe 44. 45 is a return pipe surrounding pipe 42 and screwed into a boss 46 on the front face of the header. The other end of the pipe is closed by cap 47. A similar pipe 48 surrounds pipe 43, pipe 48 being connected with pipe 45 by a branch pipe 49 which incloses the branch pipe 44. Arranged at intervals on the inner pipes 42, 43, are guiding and centering devices 50 (Fig. 4), these devices being formed with lugs 51 which bear upon the inner surfaces of the outer pipes. The guiding and centering devices intermediate the ends of the pipes are, in effect, unions joining the sections of which each of said pipes is composed.

Arranged at suitable intervals are supports for the outer pipes, these supports consisting preferably, in each case, of upper and lower members 52, 53 having curved portions extending around the pipes, the lower member being provided with legs 54 and with a central leg 55, the members being secured together by clamping bolts 56 and by the bolt 57 which holds the clamping member to the central leg 55.

Operation: When the steam is turned on it passes through pipe 33, nipple 34, inlet chamber 31 into pipes 42 and pipes 43. These pipes being open at their ends, the medium flows back through return pipes 45, 48 and to the trap 38 through outlet chamber 32, nipple 36 and pipe 37. Both inner and outer pipes are free to expand and contract.

By arranging the header at one end of the tank it does not interfere with the outflow of the oil, or other liquid, through the discharge opening 26 at the middle of the car, nor with the cleaning of the tank around the outlet. At the same time the circulating pipes, by extending on opposite sides of the opening, heat the region immediately adjacent thereto. By arranging pipe 43 as a branch of pipe 42, so that both pipe units have but a single connection with the header, the latter may be made comparatively small. It is desirable to make the apparatus as small and compact as possible so that its presence in the tank will not reduce its capacity any more than necessary. Furthermore, by making the header small, and with a comparatively small base plate, the danger of the rivets being sheared by difference in expansion and contraction between the header and the tank sheathing is minimized.

A modified construction is shown in Figs. 10 and 11. In this arrangement there are four heating elements 58, 59, 60 and 61, each of which is connected with the header 62.

This application is a continuation in part of my pending application Serial No. 86,923, filed March 27, 1916.

I claim:

1. The combination with a tank car having a discharge opening, of a header located within the tank at a point remote from said discharge opening and provided with inlet and outlet chambers, a set of circulating pipes extending lengthwise of said tank, secured to said header and communicating with the inlet chamber thereof, and open at their outer ends, and a set of return pipes surrounding said first named pipes respectively, connected at one end with the said header and communicating with the outlet chamber thereof and closed at their opposite extremities.

2. The combination with a tank car, of a header located within the tank at one end thereof and provided with inlet and outlet chambers, a set of sectional circulating pipes secured together and extending the length of said tank, secured to said header and communicating with the inlet chamber thereof, and open at their outer ends, and a set of return pipes surrounding said first named pipes respectively, connected at one end with the said header and communicating with the outlet chamber thereof and closed at their opposite extremities, said header being formed with a base for attachment to the bottom of the tank and being constructed so as to provide an opening through the structure near the bottom through which liquid in the end of the tank may flow.

3. The combination with a tank car, of a header located within the tank at one end thereof and provided with inlet and outlet chambers and formed with a base plate for attachment to the tank and with an opening therethrough above said base plate, a set of pipes made in sections and secured together so as to extend the length of said tank, secured to said header and communicating with the inlet chamber thereof and open at their outer ends, a set of return pipes surrounding the first named pipes respectively connected with the header and communicating with the outlet chamber thereof at one end and closed at their opposite extremities.

4. The combination with a tank car, of a header located within the tank at one end thereof and provided with inlet and outlet chambers, a set of sectional circulating pipes secured together and extending the length of said tank, secured to said header and communicating with the inlet chamber thereof, and open at their outer ends, a set of sectional return pipes secured together and surrounding said first named pipes respectively, connected at one end with a header and communicating with the outlet chamber thereof and closed at their opposite extremities, and a plurality of guiding and centering devices between the inner and outer pipes for guiding and centering one with respect to the other.

5. The combination with a tank car having a discharge opening, of a header located within the tank at a point remote from said discharge opening and provided with inlet and outlet chambers, a pair of pipes, one connected to the header so as to communicate with the inlet chamber thereof and the other connected to the pipe just mentioned, both being open at the ends remote from the header, and a similar pair of pipes surrounding the aforesaid pipes respectively, closed at their ends remote from the header, one of which is connected with the header so as to communicate with the outlet chamber thereof.

6. The combination with a tank car, of a header located within the tank provided with inlet and outlet chambers, a pair of pipes, one connected to the header so as to communicate with the inlet chamber thereof and the other connected to the pipe just mentioned, both being open at the ends remote from the header, and a similar pair of pipes surrounding the aforesaid pipes respectively, closed at their ends remote from the header, one of which is connected with the header so as to communicate with the outlet chamber thereof, and the other pipe connected to the first pipe of the last mentioned pair.

7. The combination with a tank car, of a header arranged at one end of the tank, formed with inlet and outlet chambers provided with a base plate for attachment to the bottom of the tank and formed with an opening therethrough just above said base plate, a plurality of heating units in said tank each comprising a pipe secured to said header at one end and communicating with the inlet chamber thereof, and a branch pipe secured to and opening out of the first mentioned pipe, a pair of return pipes surrounding the said first named pipes respectively, one of which is secured to the header and communicates with the outlet chamber thereof, the other being connected with the first named return pipe, means for supporting said outer pipes at intervals the length of the car, and guiding and centering devices on the inner pipes.

EDWARD A. SCHREIBER.